United States Patent
Böhnig et al.

(10) Patent No.: US 6,892,130 B2
(45) Date of Patent: May 10, 2005

(54) METHOD FOR DETECTING ROTATIONAL SPEED

(75) Inventors: Ralf Böhnig, Regensburg (DE); Achim Przymusinski, Lappersdorf (DE); Christian Stahl, Obertraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/786,358

(22) Filed: Feb. 25, 2004

(65) Prior Publication Data

US 2004/0167703 A1 Aug. 26, 2004

Related U.S. Application Data

(63) Continuation of application No. PCT/DE02/03302, filed on Sep. 6, 2002.

(30) Foreign Application Priority Data

Sep. 7, 2001 (DE) .......................................... 101 43 953

(51) Int. Cl.$^7$ ............................................... G06F 19/00
(52) U.S. Cl. ...................................... 701/110; 701/102
(58) Field of Search ................................. 701/110, 101, 701/115, 102, 29, 35

(56) References Cited

U.S. PATENT DOCUMENTS 4,982,330 A * 1/1991 Karle et al. ................. 701/101

FOREIGN PATENT DOCUMENTS

| DE | 39 39 113 A1 | * | 5/1991 | ............. G01D/1/02 |
| DE | 4215581 A1 | | 11/1993 | ........... F02D/41/00 |
| EP | 0367993 A1 | | 9/1989 | ........... F02D/41/16 |
| GB | 2134265 A | | 8/1984 | ........... G01P/3/488 |
| GB | 2346449 A | | 8/2000 | ........... G01P/3/489 |

* cited by examiner

Primary Examiner—Hieu T. Vo
(74) Attorney, Agent, or Firm—Baker Botts L.L.P.

(57) ABSTRACT

In a method for detecting rotational speed of an internal combustion engine (1), a sector wheel (4) which is driven by the internal combustion engine (1) is scanned, the throughflow of a specific segment of the sector wheel is detected, the duration of said segment-throughflow is measured and a rotational speed value is determined therefrom. Additionally, the throughflow of a specific part of the segment is detected before and after determination of the rotational speed value and a gradient of the duration of the partial segment throughflow is determined in order to update the rotational speed value.

16 Claims, 2 Drawing Sheets

METHOD FOR DETECTING ROTATIONAL SPEED

CROSS REFERENCE TO RELATED APPLICATION

This application is a continuation of copending International Application No. PCT/DE02/03302 filed Sep. 6, 2002 which designates the United States, and claims priority to German application no. 101 43 953.9 filed Sep. 7, 2001.

TECHNICAL FIELD OF THE INVENTION

The invention relates to a method for detecting a rotational speed of an internal combustion engine, wherein a sector wheel which is connected to a crankshaft is scanned and the duration of a pass of a segment of a sector wheel is ascertained in order to determine a rotational speed value, said segment having a specific size.

DESCRIPTION OF THE RELATED ART

Methods of this type for detecting rotational speed are usual in internal combustion engines, wherein it is normal to scan a toothed wheel having 60 teeth which is arranged on a crankshaft. As a result of the working principle of an internal combustion engine having continuous alternation between compression and expansion of the working gas, the rotational speed is not constant but is superimposed by a periodical oscillation which can arise from, in particular, differing torque contributions of individual cylinders of a multi-cylinder internal combustion engine, and therefore a time-relative averaging is normally carried out when detecting the rotational speed. This can be performed, for example, by scanning a plurality of teeth of the toothed wheel. The greater the number of scanned teeth, the smaller the interference of periodical oscillations on the determined rotational speed value. The shorter the scanned sector, the greater the error interference caused by these oscillations.

Since the duration of the segment pass is not known until the end of the segment, the rotational speed value is necessarily affected by a certain dead time. Furthermore, the detection of a segment of the sector wheel causes a certain averaging, which likewise has a negative effect on the dynamics of the rotational speed signal.

The averaging when detecting the rotational speed represents a low-pass filtering. As a result, the rotational speed value which is currently present does not represent exactly the actual rotational speed of the internal combustion engine; rapid changes in rotational speed are only shown in the rotational speed value after a certain time delay.

SUMMARY OF THE INVENTION

The invention therefore addresses the problem of specifying a method for detecting the rotational speed in an internal combustion engine, in which method the current rotational speed of the internal combustion engine can be ascertained with less time delay.

The object can be achieved by means of a method for ascertaining the rotational speed of an internal combustion engine, wherein a sector wheel which is driven by the internal combustion engine is scanned, a pass of a specific segment of the sector wheel is detected, the duration of this segment pass is measured and a rotational speed value is ascertained therefrom, a pass of a specific part of the segment is captured before and after ascertaining the rotational speed value, and a gradient of the duration of the part-segment pass is ascertained and the rotational speed value is associated with the gradient in order to update the rotational speed value.

The object can also be achieved by an arrangement for ascertaining the rotational speed of an internal combustion engine, comprising a sensor for scanning a sector wheel which is driven by the internal combustion engine, means for detecting a pass of a specific segment of the sector wheel, measuring the duration of this segment pass, and ascertaining a rotational speed value therefrom, means for detecting a pass of a specific part of the segment before and after ascertaining the rotational speed value, and ascertaining a gradient of the duration of the part-segment pass, and means for associating the rotational speed value with the gradient in order to update the rotational speed value.

The means for detecting, measuring and ascertaining can be formed by a microprocessor. Also, the means for detecting and ascertaining can be formed by a microprocessor. Furthermore, the means for associating can be formed by a microprocessor. The means for ascertaining the gradient may determine a short-time rotational speed value from each pass of the specific part of the segment, and the arithmetic average of the short-time rotational speed values before and after ascertaining the rotational speed value is used as a gradient. The gradient can be additively associated with the rotational speed value. The sensor can be a Hall sensor. The specific part of the segment of the sector wheel may comprise between $1/5$ and $1/60$ of the segment.

The concept as claimed in the invention therefore still ascertains a rotational speed value from the duration of the pass of a specific segment of the sector wheel. In this way, the width or size of the segment causes an averaging and a dead time, and consequently this rotational speed value does not yet have the desired currency.

Therefore, as claimed in the invention, additional part-segment passes are detected and analyzed. Before and after ascertaining the rotational speed value from the duration of the pass of the segment, a part-segment pass is detected and a corresponding gradient is determined in each case. Since this gradient is ascertained with the assistance of small, extremely current part-segment passes, it allows the rotational speed value to be updated. Of course, it is not possible to infer the rotational speed from the part-segment passes alone, without errors being caused by the superimposition of high-frequency interferences on the rotational speed. However, the rotational speed value can be updated on the basis of the durations of the gradients of the part-segment passes. It is therefore possible to update the rotational speed value using these gradients, whereby a rotational speed signal is obtained which has almost zero dead time in comparison with conventional low-pass filtering or averaging. Such a signal has an advantageous effect on the dynamic properties of various control circuits during the operation of an internal combustion engine (e.g. controlling the idle speed).

Because the gradient of the rotational speed information which is obtained from the part-segment passes is used for correcting the rotational speed value, information about the periodic recurrence of segment-specific oscillations is included when forming the rotational speed value.

In the case of a multi-cylinder internal combustion engine, the individual cylinders normally produce different torque contributions as a result of manufacturing tolerances. Although this can be partially equalized by a corresponding cylinder equalization adjustment, the rotational speed of the internal combustion engine nonetheless also performs a periodic oscillation due to the different torque-producing work cycles of the individual cylinders. Furthermore, the segment wheel has irregularities from its manufacturing. Therefore, it can be assumed that a profile shape of the rotational speed curve remains unchanged in comparison with a preceding segment. Since the gradient of consecutive part-segment passes is used for correcting the rotational speed value, the profile shape (which remains unchanged) of the rotational speed curve is not significant.

The method as claimed in the invention differs fundamentally from an extrapolation: a current gradient is not used to "speculate" on the future. Instead, the "obsolete" rotational speed value undergoes an upgrade with the assistance of the current gradient.

The detection and calculation of the rotational speed gradient can be carried out in many suitable ways in this case. It is possible, for example, to weight the variations of the durations of the part-segment passes in the form of a mathematical function. Depending on the permissible computing effort, different part-segment passes can also be used, in order to produce a time-relative derivation, for example.

However, a particularly simple and appropriate form of the gradient is surprisingly provided by working out the difference between two information items relating to rotational speed, said information items being obtained from durations of two consecutive part-segment passes, wherein these two passes should occur respectively directly before and after detection of the segment from which the rotational speed value is ascertained in order to achieve a maximum degree of currency. If other part-segments passes are selected for ascertaining the gradient, this clearly being possible in principle, it will sometimes be necessary to accept limitations in the currency of the corrected rotational speed information.

Working out the difference has the further advantage that an additive association with the rotational speed value is possible in this case, and therefore an operation which is known to require little computing effort can be used.

The size of the part-segment which is used for ascertaining the gradient can be adapted to the application concerned. In this case, the principle applies that shorter part-segments allow a more dynamic updating of the rotational speed value, but also result in higher susceptibility to errors from short-term interferences of the rotational speed. If the size of the part-segment is increased, this interference susceptibility decreases accordingly, but the currency of the corrected rotational speed value decreases likewise.

BRIEF DESCRIPTION OF THE DRAWINGS

By way of example, the invention is explained below in greater detail with reference to the drawing, in which.

DETAILED DESCRIPTION OF THE PREFERRED EMBODIMENTS

Figure 1:
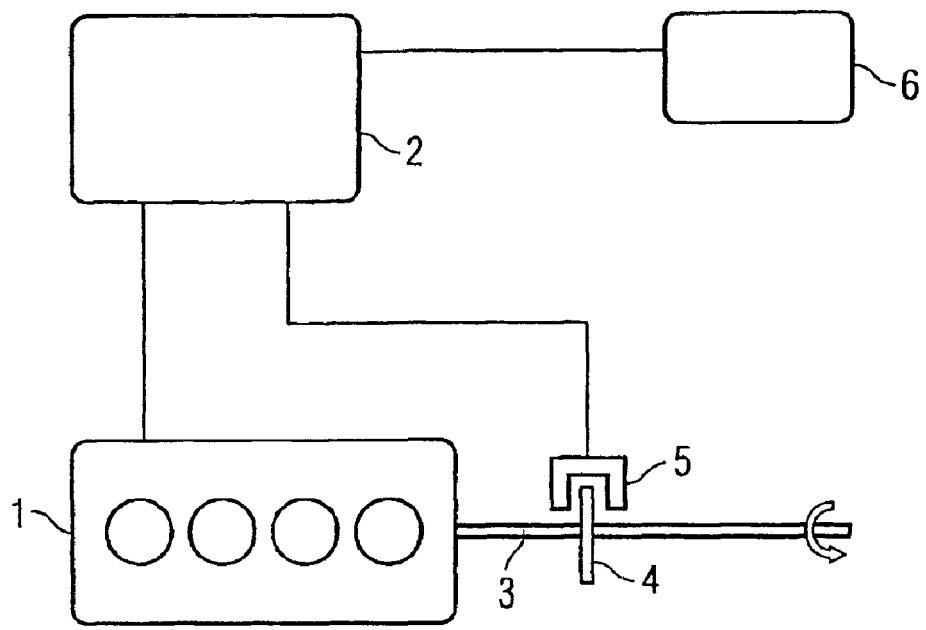
FIG. 1 shows a block schematic diagram of an internal combustion engine for which the rotational speed must be detected.

FIG. 1 is a schematic illustration of an internal combustion engine 1, whose operation is controlled by a control device 2 via lines which are not defined in detail. This control device 2 determines operating parameters of the internal combustion engine, e.g. the rotational speed N and the load, and assigns the internal combustion engine 1, which is a four-cylinder internal combustion engine in this schematically illustrated example, a quantity of fuel which is required for handling the operation.

The internal combustion engine 1 causes a crankshaft 3 to rotate, whereupon a motor vehicle (not shown) is driven. A sector wheel 4 having 60 teeth is arranged on the crankshaft 3. The teeth of the sector wheel 4 are sensed by an inductive or hall sensor 5, which conducts its signals to the control device 2 via lines which are not described.

By using the signals of the sensor 5, the control device 2 ascertains the information about the rotational speed N, said information being required for controlling the operation of the internal combustion engine 1. In a method not yet described for detecting the rotational speed, the control device 2 additionally accesses a correction module 6, which executes a correction not yet explained when ascertaining the rotational speed. In this case, the correction module 6 can also be designed as a software module for a microprocessor which is located in the control device 2.

In order to operate the internal combustion engine 1, the control device 2 requires knowledge of the current rotational speed N of the crankshaft 3. This information is required, for example, when ascertaining the amount of fuel to be injected into the cylinders of the internal combustion engine 1, which is a diesel internal combustion engine in this example, and when selecting the injection instant. For an optimum operation of the internal combustion engine, the rotational speed information should therefore be as current as possible and correspond to the actual rotational speed N of the crankshaft 3 at the instant when the injection is carried out.

The rotation of the sector wheel 4 is periodically superimposed by rotational speed oscillations, which are due to different torque contributions of the individual cylinders of the four-cylinder internal combustion engine 1 and to irregularities in the sector wheel 4.

Figure 2:
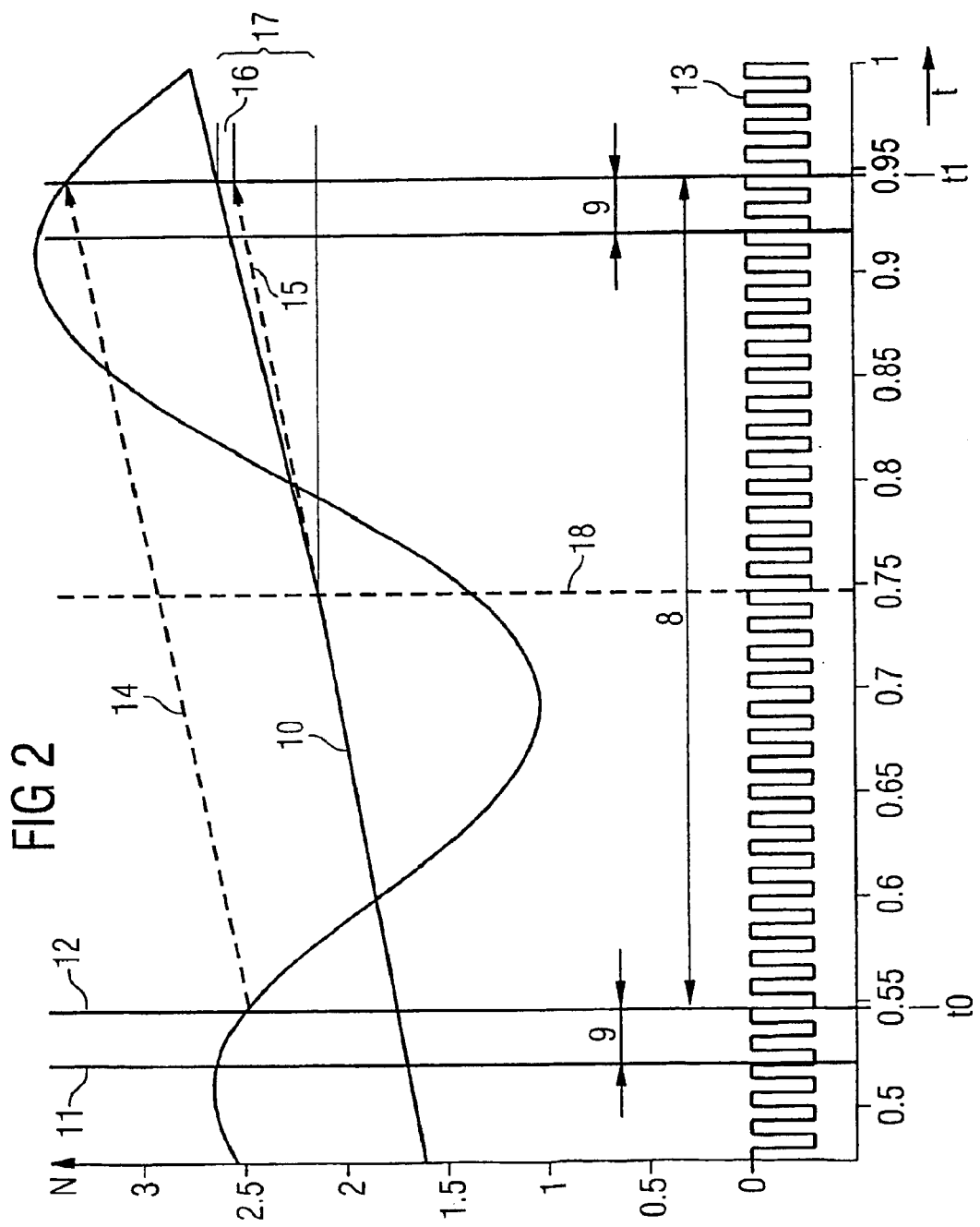
FIG. 2 shows a time series of the rotational speed curve of an internal combustion engine.

These fluctuations are easily recognizable in FIG. 2, in which the rotational speed N is plotted over the time t as a rotational speed curve 7. The average rotational speed 10 is additionally drawn in the graph in FIG. 2.

The signal of the sensor 5 is also marked in FIG. 2 as a time series 13. The rectangular signal of this time series shows the passes of the individual teeth of the sector wheel. During the pass of a segment of the sector wheel, said segment containing 30 teeth in the present example and having a width which is marked by 8 in FIG. 2, the rotational speed fluctuates clearly. As a result, at a desired instant t0 or t1 in the rotational speed of the sector wheel, said speed being reflected in the sequence of pulses of the time series 13, a momentary rotational speed was calculated which does not correspond to the average rotational speed. Therefore at the instant t0, for example, the current average rotational speed is in the order of magnitude of 1.7×1000 R/min, whereas a momentary rotational speed in the order of magnitude of 2.5×1000 R/min would be obtained from the scanning of a part-segment pass taking the form of the last three teeth before the instant t0 (this width is marked by 9 in FIG. 2).

If the average rotational speed of the internal combustion engine is ascertained from the duration of the pass of a segment having the segment width 8, the value of the average rotational speed is obtained at the segment center 18, which is marked by a broken line in FIG. 2. This average rotational speed is consequently obsolete by one half segment width.

Figure 3:
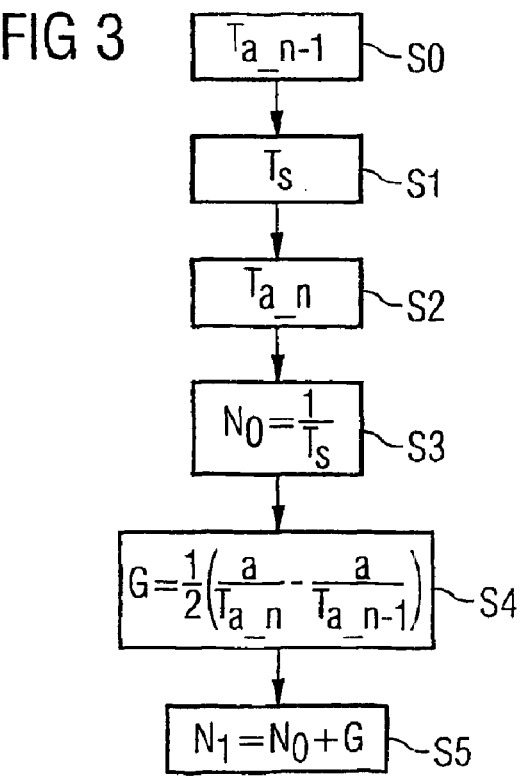
FIG. 3 shows a flowchart of a method for detecting rotational speed.

For the purpose of updating, the method which is schematically shown in FIG. 3 is carried out:

The element n or n−1 which is subsequently appended to the reference sign indicates whether the relevant variable was ascertained during the current pass of the sector wheel or during the previous pass. This element therefore represents a running index.

Firstly, in a step S0, the duration Ta_n−1 of the pass of a part-segment having the part-segment width 9 is measured. In the present example, this part segment contains three teeth of the sector wheel and is situated between the lines 11 and 12 in the illustration in FIG. 2.

In order to ascertain a first rotational speed value, the pass time of a complete segment having the segment width 8 is then detected in step S1, by measuring the time taken by the pass of the corresponding teeth of the sector wheel 4 at the sensor 5.

If the pass of all teeth of the sector wheel 4 is detected in this way, the ascertained pass time directly represents the reciprocal value of the rotational frequency of the crankshaft 3. However, if the segment whose pass time Ts is ascertained does not include all teeth of the sector wheel 4, the measured pass time must be divided by the fraction of the measured segment in relation to the overall circumference of the sector wheel, in order to obtain the rotational speed in Hz. This can also be dispensed with, however.

Next, in a step S2, the duration of the pass of the part segment having the part-segment width 9 is then measured. This is stored as duration Ta_n.

Next, in a step S3, a first rotational speed value N0 is ascertained by means of the following equation $$N0 = \frac{1}{Ts}$$

said value corresponding to the average rotational speed at the instant of the pass of the segment center 18.

Then, in a step S4, a gradient of the part-segment pass is ascertained. This gradient is marked schematically by 14 in FIG. 2. In this case, the gradient is calculated in accordance with the following formula:

$$G = \frac{1}{2}\left(\frac{a}{Ta\_n} - \frac{a}{Ta\_n-1}\right)$$

In this case, a designates the fraction of the part segment in relation to the overall circumference of the sector wheel. In the present example, the part-segment width 9 is three teeth which, in the case of a sector wheel 4 having sixty teeth, gives a fraction of a=1/20. The gradient G which is calculated thus in step S4 depicts the time-relative development of the rotational speed which is determined from the part-segment pass. Using this gradient G, the previously calculated first rotational speed value N0 is corrected in step S5 in accordance with the following equation:

$$N1=N0+G.$$

This correction is illustrated by means of an arrow 15 in FIG. 2. It can be seen that the corrected second rotational speed value N1 deviates by only a small error 16 from the actual average rotational speed which is present at the instant t1. This error 16 is very much smaller than the error 17 which would have existed between the average rotational speed at the instant of the segment center 18 and the average rotational speed at the instant t1.

We claim:
1. An arrangement for ascertaining the rotational speed of an internal combustion engine, comprising:
   a) a sensor for scanning a sector wheel which is driven by the internal combustion engine,
   b) means for detecting a pass of a specific segment of the sector wheel, measuring the duration of this segment pass, and ascertaining a rotational speed value therefrom,
   c) means for detecting a pass of a specific part of the segment before and after ascertaining the rotational speed value, and ascertaining a gradient of the duration of the part-segment pass, and
   d) means for associating the rotational speed value with the gradient in order to update the rotational speed value.
2. The arrangement as claimed in claim 1, wherein the means for detecting, measuring and ascertaining are formed by a microprocessor.
3. The arrangement as claimed in claim 1, wherein the means for detecting and ascertaining are formed by a microprocessor.
4. The arrangement as claimed in claim 1, wherein the means for associating are formed by a microprocessor.
5. The arrangement as claimed in claim 1, wherein the means for ascertaining the gradient determine a short-time rotational speed value from each pass of the specific part of the segment, and the arithmetic average of the short-time rotational speed values before and after ascertaining the rotational speed value is used as a gradient.
6. The arrangement as claimed in claim 5, wherein the gradient is additively associated with the rotational speed value.
7. The arrangement as claimed in claim 1, wherein the sensor is a Hall sensor.
8. The arrangement as claimed in claim 1, wherein the specific part of the segment of the sector wheel comprises between 1/5 and 1/60 of the segment.
9. A method for ascertaining the rotational speed of an internal combustion engine, comprising the steps of:
   a) scanning a sector wheel which is driven by the internal combustion engine,
   b) detecting a pass of a specific segment of the sector wheel, measuring the duration of this segment pass and ascertaining a rotational speed value therefrom,
   c) detecting a pass of a specific part of the segment before and after ascertaining the rotational speed value, and ascertaining a gradient of the duration of the part-segment pass, and
   d) associating the rotational speed value with the gradient in order to update the rotational speed value.
10. The method as claimed in claim 9, wherein a short-time rotational speed value is determined from each pass of the specific part of the segment, and the arithmetic average of the short-time rotational speed values before and after ascertaining the rotational speed value is used as a gradient.
11. The method as claimed in claim 10, wherein the gradient is additively associated with the rotational speed value.
12. The method as claimed in claim 9, wherein the part segment comprises between 1/5 and 1/60 of the segment.
13. A method for ascertaining the rotational speed of an internal combustion engine, comprising the steps of:
   a) scanning a sector wheel which is driven by the internal combustion engine,
   b) measuring the duration of the pass of a specific segment of the sector wheel and evaluating a rotational speed value therefrom, c) detecting a pass of a specific part of the segment before and after evaluating the rotational speed value, and evaluating a gradient of the duration of the part-segment pass, and d) associating the rotational speed value with the gradient in order to update the rotational speed value.

14. The method as claimed in claim 13, wherein a short-time rotational speed value is determined from each pass of the specific part of the segment, and the arithmetic average of the short-time rotational speed values before and after ascertaining the rotational speed value is used as a gradient.

15. The method as claimed in claim 14, wherein the gradient is additively associated with the rotational speed value.

16. The method as claimed in claim 13, wherein the part segment comprises between $\frac{1}{5}$ and $\frac{1}{60}$ of the segment.

* * * * *